United States Patent [19]
Lee et al.

[11] Patent Number: 6,071,426
[45] Date of Patent: Jun. 6, 2000

[54] MICRO BENCHTOP OPTICS BY BULK SILICON MICROMACHINING

[75] Inventors: Abraham P. Lee, Walnut Creek; Michael D. Pocha; Charles F. McConaghy, both of Livermore; Robert J. Deri, Pleasanton, all of Calif.

[73] Assignee: The Regents of the University of California, Oakland, Calif.

[21] Appl. No.: 08/986,477

[22] Filed: Dec. 8, 1997

[51] Int. Cl.[7] .............................. G02B 6/136; B29D 11/00
[52] U.S. Cl. ................................. 216/24; 216/2; 216/33; 216/99; 385/88
[58] Field of Search .................................. 216/2, 24, 33, 216/99; 385/88

[56] References Cited

U.S. PATENT DOCUMENTS

| | | | |
|---|---|---|---|
| 5,248,379 | 9/1993 | Bol | 216/2 |
| 5,761,350 | 6/1998 | Koh | 385/14 |
| 5,872,880 | 2/1999 | Maynard | 385/88 |
| 5,891,747 | 4/1999 | Farah | 438/31 |

*Primary Examiner*—Randy Gulakowski
*Assistant Examiner*—Shamim Ahmed
*Attorney, Agent, or Firm*—L.E. Carnahan; Alan H. Thompson

[57] ABSTRACT

Micromachining of bulk silicon utilizing the parallel etching characteristics of bulk silicon and integrating the parallel etch planes of silicon with silicon wafer bonding and impurity doping, enables the fabrication of on-chip optics with in situ aligned etched grooves for optical fibers, micro-lenses, photodiodes, and laser diodes. Other optical components that can be microfabricated and integrated include semi-transparent beam splitters, micro-optical scanners, pinholes, optical gratings, micro-optical filters, etc. Micromachining of bulk silicon utilizing the parallel etching characteristics thereof can be utilized to develop miniaturization of bio-instrumentation such as wavelength monitoring by fluorescence spectrometers, and other miniaturized optical systems such as Fabry-Perot interferometry for filtering of wavelengths, tunable cavity lasers, micro-holography modules, and wavelength splitters for optical communication systems.

8 Claims, 3 Drawing Sheets

MICRO BENCHTOP OPTICS BY BULK SILICON MICROMACHINING

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to bulk silicon micromachining, particularly to utilizing the parallel etching characteristics of bulk silicon micromachining, and more particularly to integrating the parallel etch planes of silicon with silicon wafer bonding, and impurity doping for etch stops to fabricate on-chip benchtop (miniature) optical systems.

In recent years micromachining of bulk silicon has been developed to a stage wherein a wide variety of micro electromechanical systems (MEMS), such as microvalves, microactuators, and microgrippers have been fabricated using this technology. For several years efforts have been directed to developing miniature silicon optical components using micromachining of bulk silicon.

The main step in bulk silicon micromachining is the patterning and selective etching of the silicon wafers. Often an anisotropic etchant is chosen with which certain crystalline planes within the single crystalline wafer have much higher etch rates than others. Therefore the resultant shape transformed from the lithography pattern exposes the slowest etching crystalline planes. These planes are either parallel to each other or at certain angles to each other. It has been discovered that by using these crystalline planes as micromirrors, miniaturized optical systems can be fabricated, and this invention capitalizes on these in situ parallel micromirrors, thereby eliminating the need for assembly and alignment. Another advantage of utilizing these crystalline planes in bulk silicon is that grooves can be etched for the placement of optical fibers that are also in situ aligned. By the use of existing bulk silicon micromachining which utilizes the crystalline planes of bulk silicon, combined with existing silicon doping/diffusion etch stop and bonding technologies, various miniature silicon optical systems can be fabricated. For example, these combined technologies, when using the crystalline planes of bulk silicon, can be used to fabricate thin film semi-transparent beam splitters, channels not only for light but for liquids as well, for applications such as electrophoresis. Also, integration of these components can be utilized to fabricate optical sensors, detectors, etc. By combining this technology with integrated microactuators, interferometry instrumentation can be fabricated. For example, a miniature optical interferometer integrated on a silicon or glass substrate can now be fabricated utilizing the combination of technologies provided by the present invention.

SUMMARY OF THE INVENTION

It is an object of the present invention to combine existing bulk silicon technologies, such as wafer bonding, precision sawing, etc., with the use of crystalline planes within the bulk silicon.

A further object of the invention is to provide a technology capable of fabricating miniature optical systems utilizing bulk silicon micromachining.

Another object of the invention is to utilize crystalline planes in bulk silicon as in situ mirrors.

Another object of the invention is to combine existing bulk silicon micromachining utilizing the crystalline planes of the bulk silicon with existing silicon doping and bonding techniques to produce a variety of miniature optical systems.

Other objects and advantages of the present invention will become apparent from the following description and accompanying drawings. Basically the invention involves the fabrication of micro-optic components or systems by bulk silicon micromachining utilizing the crystalline planes of the bulk silicon. The invention integrates the crystalline planes of bulk silicon with silicon bonding and impurity doping technologies. By use of the crystalline planes of the bulk silicon as micromirrors, optical beam splitting, in situ parallel mirror configurations, and recombination of optical beams can be provided on a miniaturized basis. Various miniature optical components and systems can be developed utilizing the combined technologies of this invention, by use of the crystalline planes of the bulk silicon. In addition, by integration of the technology produced by the present invention with microactuators, systems can be produced such as a miniature optical interferometer integrated on a silicon or glass substrate.

BRIEF DESCRIPTION OF THE DRAWINGS

The accompanying drawings, which are incorporated into and form a part of the disclosure, illustrate embodiments of devices fabricated by the invention and, together with the description, serve to explain the principles of the invention.

DETAILED DESCRIPTION OF THE INVENTION

The present invention utilizes crystalline planes in bulk silicon as micromirrors for miniaturized optical components, and which, when combined with existing silicon bonding and etching techniques enables the fabrication of miniature optical systems. By combining the present invention with existing silicon micro-machining technology the micromirrors can be integrated with microactuators for interferometry instrumentation, for example. The recognition of the use of the crystalline planes as micromirrors in bulk silicon enables the integration of parallel etch planes of silicon with silicon wafer bonding, and impurity doping for etch stops to fabricate on-chip benchtop optics with in situ aligned etched grooves for optical fibers, micro-lenses, photodiodes, and laser diodes. Using the present invention in conjunction with existing technology, other optical components which can be microfabricated and integrated include semi-transparent beam splitters, micro optical scanners, pinholes, optical gratings, micro optical filters, etc. This invention enables the fabrication, for example, of a small, low cost, chemical detector that is integrated with an electrophoresis system for detecting certain chemicals of interest. Such a detector can provide extremely sensitive detection for broad applications to liquid analytical systems, such as for biotechnology and environmental applications.

Using the present invention, a microfabricated free space Mach-Zender interferometer can be fabricated in which a laser beam is split into two beams and then recombined, with one leg of the split beam being exposed to a solution or gas under analysis, and the other functioning as a reference beam. Small variations in chemical composition change the index of refraction sufficient to cause phase changes in the beam exposed to the solution or gas which become intensity changes when recombined with the other or reference beam. This detection arrangement is extremely sensitive but not selective in that it responds to most chemical species, and thus is ideally suited when combined with an analytical separation technique, such as electrophoresis or liquid chromatography.

The drawings illustrate various devices fabricated by the present invention wherein the crystalline planes of the silicon are utilized as micromirrors, and illustrate two embodiments of a free-space interferometer, a beam splitter, and a channel-dropping wavelength filter. Thus, the drawings illustrate a variety of applications for the present invention.

Figure 1:
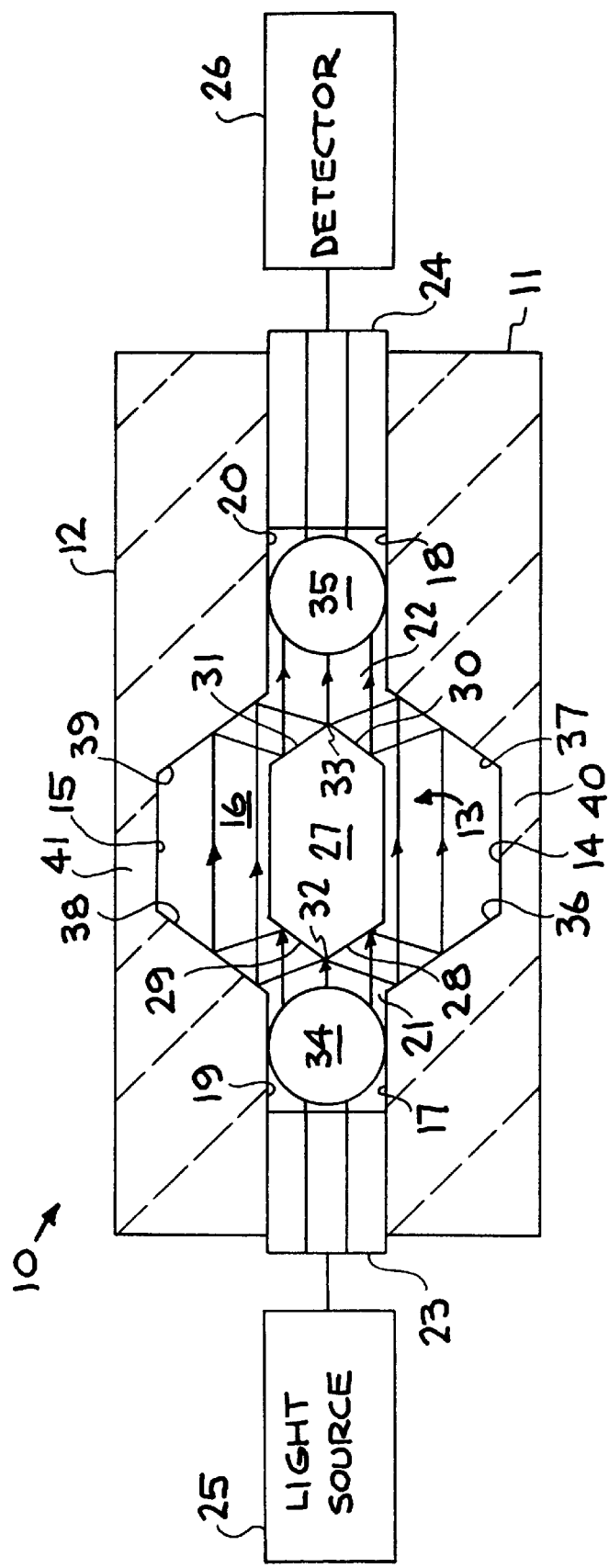
FIG. 1 is a cross-sectional view of an embodiment of a free-space interferometer using collimating ball lens and bulk micromachined silicon mirrors.

FIG. 1 illustrates in cross-section a free-space interferometer using collimating ball lens and bulk micromachined silicon mirrors. The free-space interferometer of FIG. 1, generally indicated at 10, comprises three bulk machined silicon substrates or wafers 11, 12 and 13 which are bonded together. Silicon substrates 11 and 12 each include central openings or cut-away sections 14 and 15 respectively, which form a chamber or free-space 16; and include grooves 17–18 and 19–20 respectively, which form passageways 21 and 22 in which optical fibers 23 and 24 are located. Optical fiber 23 is operatively connected to a light source 25, such as a laser, and optical fiber 24 is operatively connected to a detector system 26, such as an inferometer. Silicon substrate 13 includes a reduced cross-section portion 27 located within free-space or chamber 16, and having two tapering surfaces 28–29 and 30–31 at each end which intersect at points 32 and 33. Ball lenses 34 and 35 are located in passageways 21 and 22 intermediate optical fibers 23 and 24 and portion 27 of silicon substrate 13. The cut-away sections 14 and 15 of substrates 11 and 12 include tapered surfaces 36–37 and 38–39.

By way of example, the silicon substrates 11 and 12 may have a thickness of 100 to 2000 $\mu$m, preferably 500 $\mu$m, with the wall sections 40 and 41 of substrates 11 and 12 adjacent cut-away sections 14 and 15 having a thickness of about 70 to 1000 $\mu$m, with passageways 21 and 23 and ball lenses 34 and 35 having a diameter of 200 to 1000 $\mu$m, preferably 500 $\mu$m, and with end portion 27 of substrate 13 leaving a thickness of the width of the diameter of the passageways 21 and 23 and ball lenses 34 & 35. The tapering surfaces 28–29 and 30–31 of portion 27 of substrate 13 taper at an angle of 20° to 70°, preferably 54.7°, while the tapered surfaces 36–37 and 38–39 of chamber 16 taper at an angle of 20° to 70°, preferably 54.7°. In order for parallel planer optical beams to work properly, these angles should be the same. The ball lenses 34 and 35 may be constructed of quartz or glass, preferably quartz. The light source 25, for example, may be a solid state, diode-pumped, or gas laser operating at a wavelength dependant on the application, and thus the wavelength may be varied.

In operation of the FIG. 1 free-space interferometer, a light beam from source 25 passing through optical fiber 23 and through ball lens 34 striking the tapering surfaces 28 and 29 and the point 32 of portion 27 of silicon substrate 13 which is reflected as indicated by arrows onto surfaces 36 and 38 of substrates 11 and 12 forming chamber 16 (note that the light striking point 32 is split and legs thereof are reflected onto both surfaces 36 and 38). The light is then reflected by surfaces 36 and 38, as indicated by arrows onto respective surfaces 37 and 39 forming of chamber 16, whereafter the light is reflected from surfaces 37 and 39 onto surfaces 30 and 31 and point 33 of substrate 13 portion 27 (note that light legs from both surfaces 30 and 31 that are reflected onto point 33 and thus recombined), whereafter the light is reflected as indicated by arrows from surfaces 30–31 and point 33 through ball lens 35 and optical fiber 24 to detector 26.

Those skilled in the art will recognize that the FIG. 1 free-space interferometer may be fabricated in a variety of ways using anisotropic etching of silicon wafers. The following sequences of fabrication is presented as one example. Anisotropic etching of <100> oriented silicon using a chemical etch solution like potassium hydroxide (KOH) is described in several references. One feature of this etching technique is that V-shaped grooves, shallow wells and deep wells can all be etched in the same wafer at the same time by simply changing the dimensions of the photolithographic mask. So the deep wells forming chamber 16, the grooves to position the fibers 17–18 and 19–20 and shallow wells to surround the north and south polar regions of the ball lenses 34 can all be etched simultaneously into two silicon wafers 11–12. By simultaneously etching from both sides of a single wafer the knife edge structure of wafer 13 can be made. Since ball lenses are available with diameters varying less than 0.5%, these balls can serve the dual function of aligning the three wafers together as well as collimating the light from the optical fibers. Thus, the three wafers 11, 12, and 13 are etched first and then assembled with the ball lenses to achieve alignment. Those skilled in the art will recognize that there are many other ways to align the wafers as well. These wafers can then be bonded together using a variety of available bonding techniques. Finally, the fibers are slipped into the V-groove passageways 21–23 and held in place by a variety of adhesives available for attaching optical components.

Figure 2:
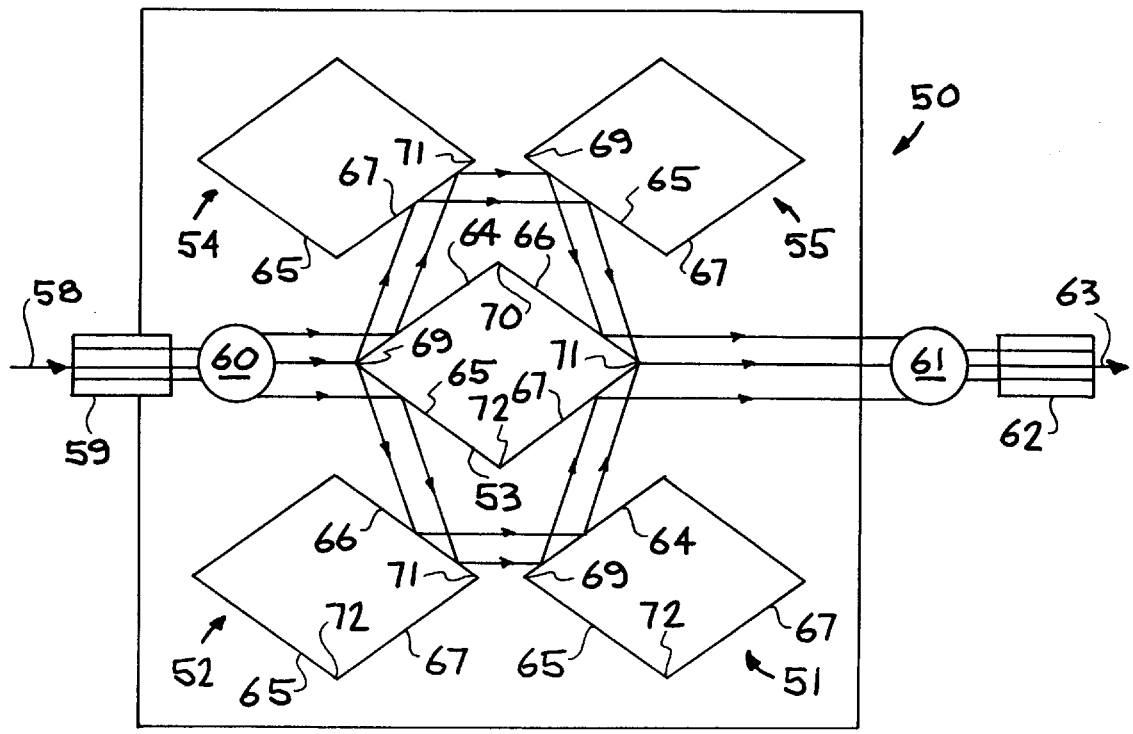
FIG. 2 is a top view of another embodiment of a free-space interferometer with p+ doped etchstops using bond-and-etchback processes.
Figure 3:
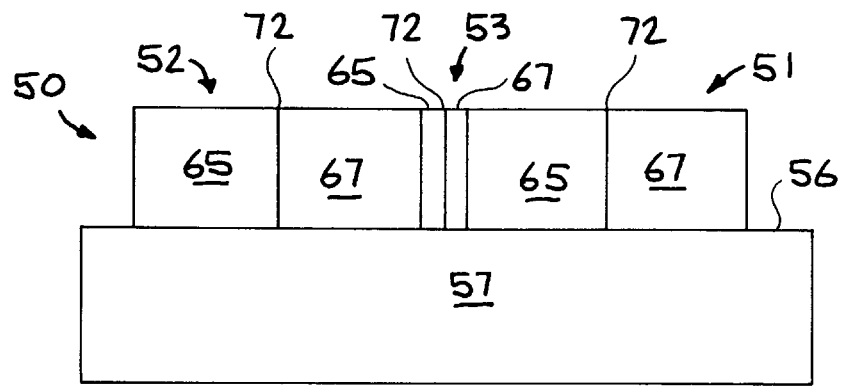
FIG. 3 is a side view of the interferometer embodiment of FIG. 2.

FIGS. 2 and 3 illustrate an embodiment of a free-space interferometer with p+ doped etchstops for a bond-and-etchback process. As shown, this device embodiment, generally indicated at 50, comprises a five diamond-shaped silicon members or mirrors 51, 52, 53, 54 and 55 anodically bonded as indicated at 56 to a Pyrex glass substrate 57, with light from a source being directed into the device 50 as indicated by arrow 58 through an optical fiber 59 on a ball lens 60 for reflection by silicon mirrors or members 51–55 as indicated by the arrows onto a ball lens 61 and out through an optical fiber 62 to a detector or other point of use, as indicated by arrow 63. Members or mirrors 51–55 each include reflective surfaces 64, 65, 67 and 68 interconnected by points 69, 70, 71 and 72. As seen in FIG. 2, light from ball lens 60 that stricks point 69 of mirror or member 53 is split and legs thereof reflected onto mirrors 52 and 54 to mirrors 51 and 55, and back to point 71 where the legs are recombined and reflected to ball lens 61. Reflective surfaces 64–68 of each mirror 51–55 is formed by appropriate doping of the silicon as described hereinafter. Also the members or mirrors 51–55 have a height of about 500 $\mu$m, the standard silicon wafer thickness, 51–55 and may be hollow or solid, and if hollow the surfaces may be semi-transparent to certain wavelengths, and thus may function as a beam splitter for certain applications.

The FIGS. 2–3 free-space interferometer may be fabricated as follows:

1. pattern diamonds 51, 52, 54, 55 aligned to the (111) crystalline planes of the mirror silicon wafer 50.
2. wet etch anisotropically or deep RIE (reactive ion etch) the diamond patterns through the thickness of the silicon wafer 50.
3. anodic bond the silicon wafer 50 to the Pyrex glass 57.
4. boron p+ dope the bonded silicon wafer to the targeted thickness of the mirrors 51, 52, 54, 55.
5. RIE to remove the top layer of boron-doped silicon.
6. (optional) thermal oxidation of the silicon wafer and RIE to remove top layer of $SiO_2$.
7. wet etch exposed silicon leaving behind the stand-off parallel mirrors.

Figure 4:
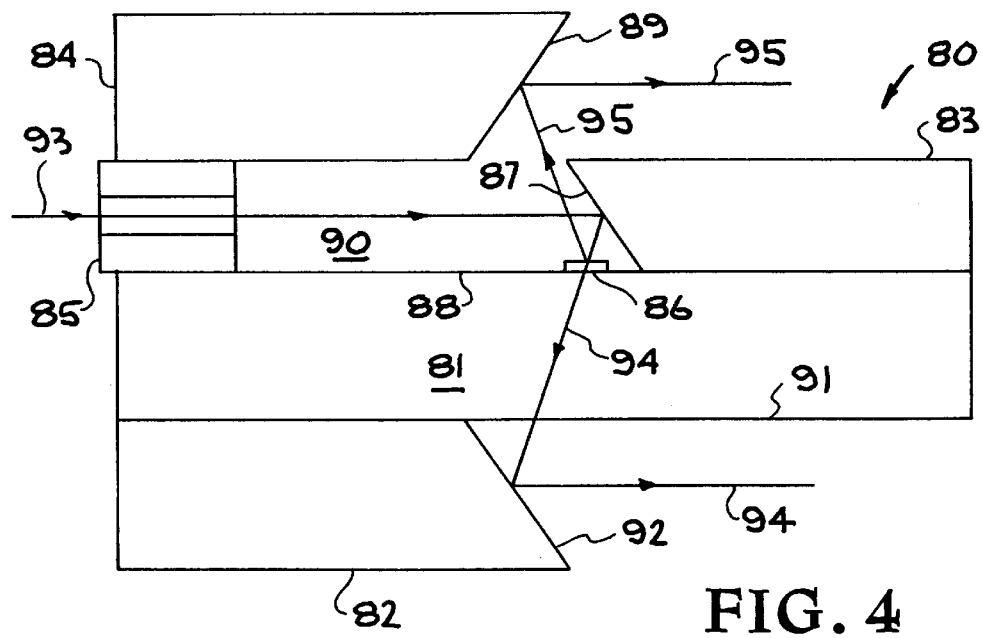
FIG. 4 is a cross-sectional view of a channel-dropping wavelength filter fabricated in accordance with the invention for use in optical communication.

FIG. 4 illustrates in cross-section an embodiment of a channel-doping wavelength filter that can be used for optical communication. This embodiment, indicated generally at 80 comprises a Pyrex glass substrate 81 and three silicon members or wafers 82, 83 and 84 bonded to either the substrate 81 or to another silicon member as described hereinafter. An optical fiber 85, a multilayer mirror 86 and silicon member 83, having a tapered end surface 87 are located adjacent a surface 88 of substrate 81, while silicon member 84, having a tapered end surface 89, is located in spaced relation to substrate surface 88 thereby forming an opening or cavity 90. Silicon member 82 is located on an opposite side surface 91 of substrate 81 and includes a tapered end surface 92.

In operation of the FIG. 4 embodiment, light beam from a source, indicated by arrow 93 is directed through optical fiber 85, through cavity 90 and onto surface 87 of silicon member 83 where it is reflected onto multilayer mirror 86 which is designed for wavelength filtering, or can function as a beam splitter. The light beam 93 is split into two legs or beams 94 and 95, with beam or leg 94 passing through multilayer mirror 86 to surface 92 of silicon member 82, and with beam or leg 95 being reflected by mirror 86 onto surface 89 of silicon member 84, whereby beams 94 and 95 are reflected by surfaces 92 and 89 to points of use.

An example of the fabrication of the FIG. 4 embodiment is as follows: Use anisotropic etching techniques as discussed in the description of the FIG. 1 embodiment to pattern the sloping sides of three silicon wafers 82, 83, 84. A wafer 81 made of Pyrex glass, quartz or other transparent material has formed on it a multilayer mirror 86 using standard deposition and photolithographic techniques well known to those skilled in the art. The above four layers are sandwiched together and aligned using a technique like the ball lenses mentioned in the FIG. 1 embodiment or one of several other well known aligrnent techniques. The layers are bonded using standard bonding techniques and finally the fiber is inserted and attached using standard adhesives.

Figure 5:
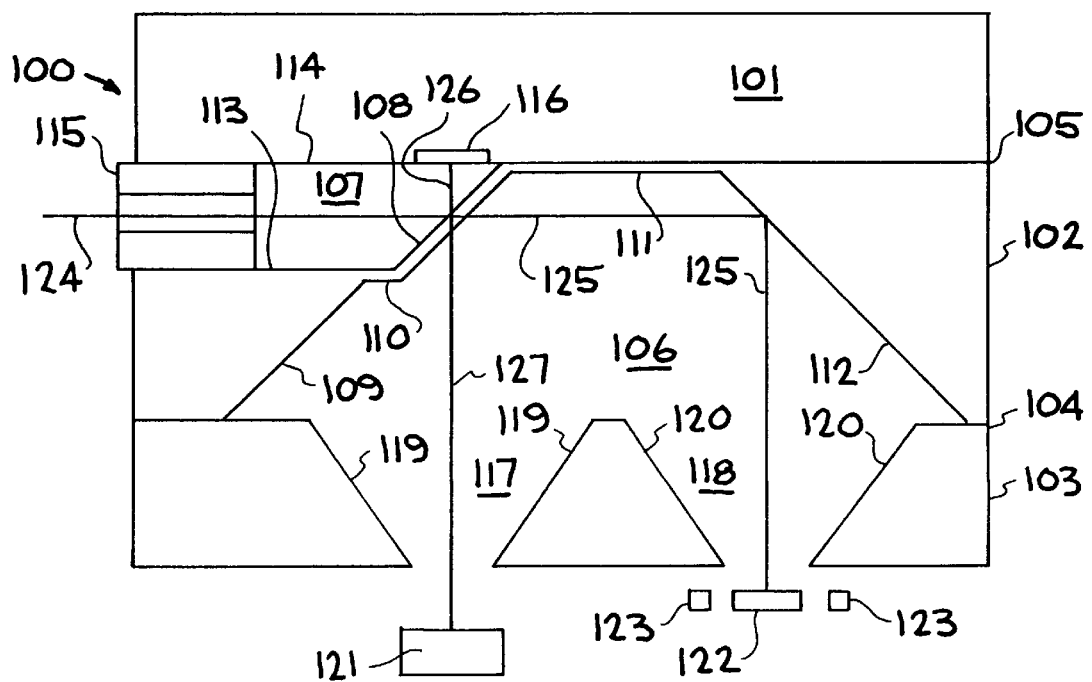
FIG. 5 is a cross-sectional view of an integrated interferometry arrangement with a beam splitter made in accordance with the invention.

FIG. 5 illustrates an embodiment of an integrated interformetry arrangement with a beam splitter formed by a doped silicon wall. A microactuator can be integrated for tuning of the interference between the two beams. This embodiment, indicated at 100, comprises a Pyrex glass substrate 101 and silicon members or wafers 102 and 103 bonded together at 104 and with silicon member 102 bonded to substrate 101 at 105. Silicon member 102 includes a pair of cut-away sections or cavities 106 and 107 separated by a tapering, doped wall section 108. Cut-away section 106 is defined by a tapered surface 109, a flat surface 110, wall section 108, a flat surface 111 and a tapered surface 112. Cut-away section 107 is defined by surface 113, wall section 108 and a surface 114 of substrate 101. An optical fiber 115 extends into cut-away section or cavity 107. A mirror 116 is mounted or formed in surface 114 of substrate 101. Silicon member 103 includes a pair of openings 117 and 118 defined by tapered surfaces 119 and 120, respectively. Opening 117 is aligned with wall section 108 of silicon member 102 and opening 120 is aligned with tapered surface 112 of silicon member 102. A camera 121 is positioned in alignment through opening 117 with mirror 116, and a phase shifter 122 having suppression grids 123 is positioned in alignment through opening 118 with tapered surface 112 of silicon member 102. Tapered wall section 108 is doped, as described hereinafter to form a beam splitter.

In operation, a light beam from a source, indicated at 124 is directed through optical fiber 115, cavity 107 onto tapered, doped wall section 108 wherein the light beam 124 is split with a leg 125 passing through wall section 108 onto tapered surface 112 of silicon member 102 and is reflected onto phase shifter 122, which a leg 126 of beam 124 is reflected onto mirror 116 which is detected by camera 121 as indicated by line 127.

The FIG. 5 embodiment may be fabricated as follows:

1. pattern and etch V-groove and thin film window onto wafer member 102.
2. pattern mirror on Pyrex glass member 101.
3. anodically bond 101 to 102.
4. boron p+ dope the bonded silicon wafer 102 to thickness of the beam splitting window 108.
5. RIE the back side 104 of the silicon wafer 102 to remove the layer of boron doped thickness.
6. pattern silicon wafer 101 on backside 104 to open up the well for back side etching.
7. anisotropically wet etch the silicon wafer 102 to form the beam splitting window and the reflecting mirror 112.
8. surface micromachine the phase shifter 122 on the silicon wafer 103.
9. pattern and etch wafer 103 to generate the optical beam paths to the phase shifter and the camera.
10. silicon to silicon fusion bond 103 to 102.

It has thus been shown that by utilizing the parallel etching characteristics of bulk silicon micromachining, micromirrors that provide optical beam reflection and splitting, in situ mirror configurations, and recombination of optical beams can be fabricated. This invention integrates the parallel etch planes of silicon with silicon wafer bonding, impurity doping for etch stops, to fabricate on-chip benchtop optics with in situ aligned etched grooves for optical fibers, micro-lenses, photodiodes, and laser diodes. Other optical components can be microfabricated using crystalline planes within a single crystalline silicon wafer.

While particular embodiments and sequences of fabrication have been illustrated and described to exemplify and set the principles of bulk silicon micromachining which utilizes the crystalline planes of the silicon, such are not intended to be limiting. Modifications and changes may become apparent to those skilled in the art, and it is intended that the invention be limited only by the scope of the appended claims.

The invention claimed is:

1. In a process for bulk silicon micromachining, the improvement, comprising:

using crystalline planes of the bulk silicon as micromirrors, utilizing parallel etching of the bulk silicon crystalline planes to fabricate in situ optical beam splitters and recombination of a split beam, utilizing the crystalline planes of bulk silicon as micromirrors in combination with silicon etching, bonding and doping techniques to produce miniaturized optical components, and integrating microactuators with the micromirrors to fabricate interferometry instrumentation.

2. The improvement of claim 1, wherein the crystalline planes used as micromirrors are either parallel to each other or at angles to each other.

3. The improvement of claim 1, wherein utilizing the crystalline planes in the bulk silicon provided in situ parallel micromirrors for miniaturization of optical components.

4. The improvement of claim 1, additionally including doping of the silicon crystalline planes to change the optical characteristics thereof.

5. The improvement of claim 1, additionally including providing three silicon members, etching two of the silicon members along crystalline planes to form cavities in each have micromirror surfaces, micromachining the third silicon member to include an end section having a pair of adjoining tapered surfaces forming a point on opposite sides thereof, forming a plurality of grooves in each of the two silicon members which intersect with the thus formed cavity, providing a pair of lenses and a pair of optical fibers, and bonding the silicon members together such that one lens and one optical fiber are positioned in the grooves of the two silicon members and the end section of the third silicon member is located in the cavities formed in the two silicon members such that the point on opposite sides of the end section are aligned with the lens in each groove, whereby light through one optical fiber and lens is both split and reflected by one end of the end section of the third silicon member, reflected by the micromirrors in the cavities formed in the two silicon members onto an opposite end of the end section of the third silicon member and recombined and reflected onto the other lens and optical fibers.

6. The improvement of claim 1, additionally including forming at least one micromirror on each of a plurality of silicon members, and bonding the silicon members together such that a beam of light directed thereinto is at least reflected with the silicon members by the micromirrors and passed out of the bonded silicon members.

7. The improvement of claim 6, additionally including forming a beam splitter within the silicon members so that the incoming beam of light is split within the bonded silicon members and passed out of the bonded silicon members as two beams.

8. The improvement of claim 7, additionally including doping of one of the micromirrors to form the beam splitter.

* * * * *